(12) United States Patent
Cha et al.

(10) Patent No.: US 12,090,851 B2
(45) Date of Patent: Sep. 17, 2024

(54) METHOD AND DEVICE FOR GUIDING ITEM ARRANGEMENT IN VEHICLE

(71) Applicants: Hyundai Motor Company, Seoul (KR); Kia Corporation, Seoul (KR)

(72) Inventors: Hyung Ju Cha, Seoul (KR); Ja Yoon Goo, Anyang-si (KR); Jung Seok Suh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 60 days.

(21) Appl. No.: 17/967,253

(22) Filed: Oct. 17, 2022

(65) Prior Publication Data

US 2023/0256821 A1 Aug. 17, 2023

(30) Foreign Application Priority Data

Feb. 14, 2022 (KR) .................... 10-2022-0019170

(51) Int. Cl.
*B60K 35/00* (2024.01)
*B60K 35/22* (2024.01)
*B60K 35/28* (2024.01)

(52) U.S. Cl.
CPC .............. *B60K 35/00* (2013.01); *B60K 35/22* (2024.01); *B60K 35/28* (2024.01); *B60K 2360/16* (2024.01); *B60K 2360/21* (2024.01)

(58) Field of Classification Search
None
See application file for complete search history.

(56) References Cited

U.S. PATENT DOCUMENTS

| 2020/0164770 A1* | 5/2020 | Lee | B60R 16/037 |
| 2020/0394746 A1* | 12/2020 | Krishnamurthy | G06V 20/56 |
| 2022/0306165 A1* | 9/2022 | Brown | G05D 1/0214 |

FOREIGN PATENT DOCUMENTS

KR 20180119055 A 11/2018

* cited by examiner

*Primary Examiner* — Thomas S McCormack
(74) *Attorney, Agent, or Firm* — Slater Matsil, LLP (57) ABSTRACT

An embodiment method, performed by a device, for guiding an item arrangement in a vehicle includes acquiring first information on an item, determining a loading space in which the item is to be loaded and an arrangement location at which the item is to be placed in the loading space based on the first information and second information on an interior space of the vehicle, and generating arrangement guide information based on the loading space and the arrangement location.

20 Claims, 8 Drawing Sheets

METHOD AND DEVICE FOR GUIDING ITEM ARRANGEMENT IN VEHICLE

CROSS-REFERENCE TO RELATED APPLICATIONS

The present application is based on, and claims the benefit of priority from, Korean Patent Application Number 10-2022-0019170, filed on Feb. 14, 2022, the entire disclosure of which is incorporated herein by reference.

TECHNICAL FIELD

The present disclosure relates to a method and a device for guiding an item arrangement in a vehicle.

BACKGROUND

The content described below simply provides background information related to the present disclosure, but does not constitute the prior art.

In a vehicle, there are various spaces for placing items such as trunks, frunks, seats, floors, and the like. Currently, it depends on a user's experience how and where to place the items in the vehicle. Accordingly, in case that a user lacks experience with the vehicle which the user wants to board, it may be difficult for the user to determine whether an item can be loaded in the vehicle or where to place the item.

SUMMARY

At least one embodiment of the present disclosure provides a method, performed by a device, for guiding an item arrangement in a vehicle using a guide device. The method includes acquiring first information on an item, determining a loading space in which the item is to be loaded and an arrangement location at which the item is to be placed in the loading space based on the first information and second information on an interior space of the vehicle, and generating arrangement guide information based on the loading space and the arrangement location.

Another embodiment of the present disclosure provides a device including an acquisition unit configured to acquire first information on an item, a determination unit configured to determine a loading space in which the item is to be loaded and an arrangement location at which the item is to be placed in the loading space, based on the first information and second information on an interior space of a vehicle, and a generation unit configured to generate arrangement guide information based on the loading space and the arrangement location.

Another embodiment of the present disclosure provides a vehicle including a camera and a guide device. The guide device is configured to acquire first information on an item based on an image photographed by the camera, to determine a loading space in which the item is to be loaded and an arrangement location at which the item is to be placed in the loading space based on the first information and second information on an interior space of the vehicle, and to generate arrangement guide information based on the loading space and the arrangement location.

DETAILED DESCRIPTION OF ILLUSTRATIVE EMBODIMENTS

The present disclosure in some embodiments may provide guide information for loading or arrangement of items to a user who intends to load the items in a vehicle.

Features achievable by embodiments of the present disclosure are not limited to the above-mentioned features, and other features not mentioned will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or the sequence of the components. Throughout this specification, when parts "include" or "comprise" a component, they are meant to further include other components, not to exclude thereof unless there is a particular description contrary thereto.

The description of embodiments of the present disclosure to follow in conjunction with the accompanying drawings is intended to describe exemplary embodiments of the present disclosure and is not intended to represent the only embodiments in which the technical idea of the present disclosure may be practiced.

Figure 1:
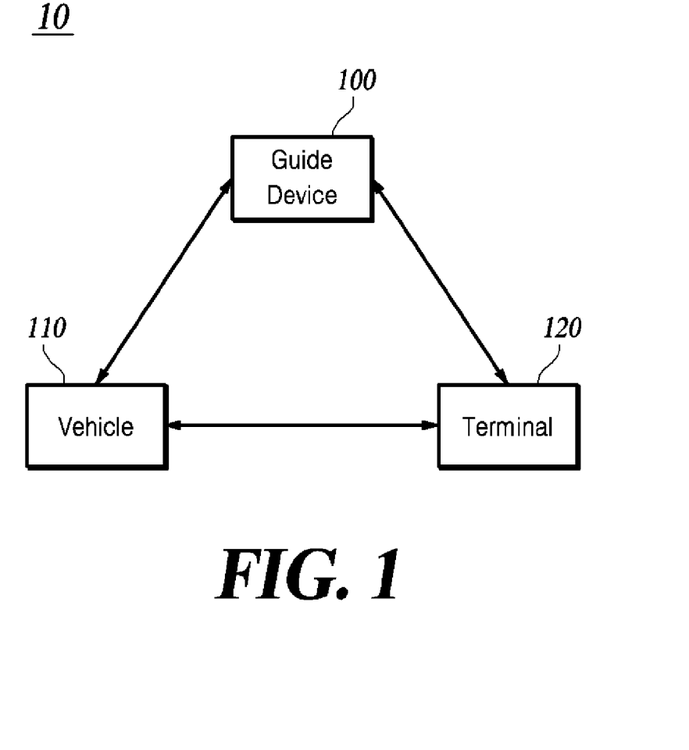
FIG. 1 is a block diagram schematically illustrating a guide system according to one exemplary embodiment of the present disclosure.

FIG. 1 is a block diagram schematically illustrating a guide system according to one exemplary embodiment of the present disclosure.

As shown in FIG. 1, the guide system 10 according to one embodiment of the present disclosure may include all or some of a guide device 100, a vehicle 110, and/or a terminal 120. Not all of the blocks shown in FIG. 1 are essential components, and in another embodiment, some blocks included in the guide system 10 may be added, changed, or removed.

The guide device 100 may provide guide information on loading or arrangement of one or more items to a user who intends to load the items in the vehicle. Meanwhile, in FIG. 1, the guide device 100, the vehicle 110, and the terminal 120 are illustrated as independent components, but the present disclosure is not limited thereto. According to another embodiment of the present disclosure, the functions of the guide device 100 may be integrated into the vehicle 110 or the terminal 120 to be implemented.

In case that the guide device 100 is implemented as an independent component with the vehicle 110 and the terminal 120, the guide device 100 may be a server that is connected to the vehicle 110 and/or the terminal 120 through a wireless network to perform mutual data communication therewith. In some embodiments, the guide device 100 may store and manage information received from the vehicle 110 and/or the terminal 120 connected through a wireless network.

The vehicle 110 may be a transportation having a loading space, such as a car, a bus, and a truck, but is not limited to the above-described examples. Hereinafter, for convenience of descriptions, the vehicle 110 will be described as a car.

The terminal 120 may be defined as a terminal of a user who receives an item arrangement guide service. For example, the terminal 120 may be provided as one of various electronic devices such as a smartphone, a smartwatch, a tablet, a computer, an ultra mobile personal computer (UMPC), a workstation, a netbook, a personal digital assistant (PDA), a portable computer, a portable multimedia player (PMP), a portable game device, a navigation box, a black box, and a digital camera, but is not limited to the above-described examples.

The terminal 120 according to one embodiment of the present disclosure may include an application for item arrangement guide service. The terminal 120 may execute the application for the guide service of item arrangement to receive the guide service of item arrangement from the guide device 100.

The vehicle 110 and/or the terminal 120 may receive arrangement guide information from the guide device 100. The arrangement guide information may include information on the loading space in which an item is to be loaded and an arrangement location at which the item is to be placed in the loading space. For example, the arrangement guide information may include an item arrangement diagram visually representing the arrangement location at which the item is to be placed in the loading space. As another example, the arrangement guide information may include a message notifying the loading space and the arrangement location.

The vehicle 110 and/or the terminal 120 may output the item arrangement diagram through a display. Thereafter, in case that the item arrangement diagram is modified by the user, the vehicle 110 and/or the terminal 120 may transmit arrangement change information corresponding to the modified item arrangement diagram to the guide device 100.

Figure 2:
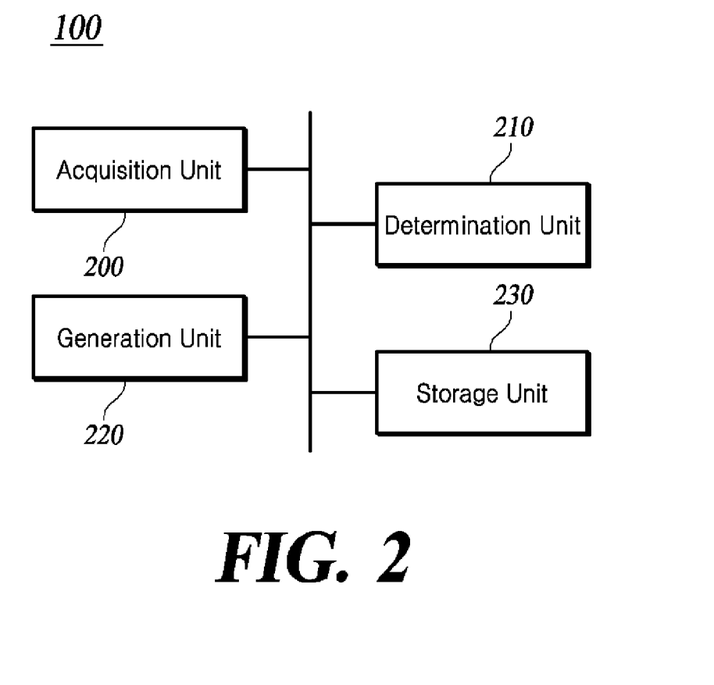
FIG. 2 is a block diagram schematically illustrating a guide device according to one exemplary embodiment of the present disclosure.

FIG. 2 is a block diagram schematically illustrating the guide device according to one exemplary embodiment of the present disclosure.

As shown in FIG. 2, the guide device 100 according to one embodiment of the present disclosure may include all or some of an acquisition unit 200, a determination unit 210, a generation unit 220, and/or a storage unit 230. Not all of the blocks shown in FIG. 2 are essential components, and in another embodiment, some blocks included in the guide device 100 may be added, changed, or removed. Each component of the guide device 100 may be implemented as hardware or software, or may be implemented as a combination of hardware and software. In addition, functions of each component may be implemented as software and one or more processors may be implemented to execute functions of software corresponding to each component.

The acquisition unit 200 may acquire information on one or more items. Here, the information on the items may include the number of the items, types of each item, sizes of each item, weights of each item, and/or priority information of each item.

In one embodiment, the acquisition unit 200 may receive information on the items which is input by a user. The user may input the number of the items, and the type, the size, and/or the weight of each item through a human machine interface (HMI) provided in the vehicle 110 or the terminal 120.

In one embodiment, the acquisition unit 200 may further receive the priority information input by the user as the information on the items. Here, the priority information may include whether it is a heavy item, whether the item is likely to be damaged, unloading locations and/or unloading order corresponding to the items. To this end, the user may input whether it is a heavy item, whether the item is likely to be damaged, the unloading locations and/or the unloading order corresponding to the items through the HMI provided in the vehicle 110 or the terminal 120.

In another embodiment, the acquisition unit 200 may receive identification information of each item and may acquire the information on the items based on the identification information. Here, the identification information may be images obtained by photographing the items, names of the items, and serial numbers, QR codes, and barcodes corresponding to the items. For example, the vehicle 110 or the terminal 120 may photograph the items using a camera, or may photograph a QR code and/or a barcode, and transmit them to the guide device 100. In another example, the vehicle 110 or the terminal 120 may recognize the serial numbers of the items through communication with a smart tag or the like provided to the items, and transmit the serial numbers to the guide device 100.

The acquisition unit 200 may determine the information on the items based on the identification information of the items. For example, the acquisition unit 200 may determine the information on the items using a previously learned analysis model to analyze the information on the items based on the identification information of the items. The analysis model may be trained to determine, for example, at least a part of the number of the items, and the type, the size, and the weight of each item based on the images acquired by photographing the items.

The acquisition unit 200 may detect the information on the items by inquiring for identification information from a storage unit 230 or from an item information database previously stored in a separate external server. For example, the acquisition unit 200 may transmit the identification information of the items to the external server and receive the information on the items from the external server. The external server may be, for example, a server operated by a manufacturer or a seller of the items, but is not limited thereto.

The determination unit 210 may determine the loading space in which each item is to be loaded and the arrangement locations in which each item is to be placed in the loading space based on one or more of the information on the items, the interior space of the vehicle, and previously stored arrangement history. In determining the arrangement locations of the items, the determination unit 210 may also determine the arrangement postures of the items.

In some embodiments, the determination unit 210 may determine any one or more of a trunk, a frunk, a floor, a seat, and a folded seat as the loading space in which the items are to be loaded. For example, the determination unit 210 may determine the loading space by comparing the size of each space inside the vehicle with the size of each item.

In some embodiments, the determination unit 210 may determine a plurality of candidate spaces based on the sizes of the items and the sizes of the interior spaces of the vehicle, and may determine one or more loading spaces among the plurality of candidate spaces based on the type, the weight, and/or the priority information of each item.

As an example, when the type of the item is a car seat, the determination unit 210 may determine the second row seat as the loading space for loading the item.

As another example, when the type of the item is an article that is likely to be damaged, such as a bottle or a bowl, or in case that the user input the information that the item is likely to be damaged as priority information, the determination unit 210 may determine the first row or second row floor as the loading space for loading the item.

In some embodiments, the determination unit 210 may determine the arrangement location at which each item is to be placed in the determined loading space based on the type, the weight, and/or the priority information of the item. In determining the arrangement location, the determination unit 210 may determine a relative position of the item with respect to other items in the loading space based on the type, the weight, and/or the priority information of the item. For example, the determination unit 210 may determine whether to place the item at an outer side or a lower side relative to other items in the loading space.

For example, the determination unit 210 may determine the arrangement locations such that the item which is expected to be unloaded first among the plurality of items is placed at the outer side in the loading space based on the priority information of the items input by the user. Here, being placed at the outer side in the loading space may mean being placed close to a door, a trunk door, or a tailgate of the vehicle. In addition, in case that the plurality of items is stacked, being placed at the outer side in the loading space may mean being placed at the upper side of another item.

As another example, based on the priority information of the items input by the user, the determination unit 210 may determine the arrangement locations such that a heavier item is placed at a lower side in the loading space, and may determine the arrangement locations such that an item which is likely to be damaged is placed at an upper side in the loading space.

In some embodiments, when there is pre-stored arrangement history for the items, the determination unit 210 may determine the loading space and/or the arrangement locations based on the corresponding arrangement history. Accordingly, the arrangement guide information reflecting a user's preference may be provided.

In some embodiments, before determining the loading space and the arrangement location, the determination unit 210 may determine whether the item can be loaded in the corresponding vehicle based on the information on the item and interior space information of the vehicle. In response to determining that it is impossible to load the item in the vehicle, the determination unit 210 may refer to a vehicle type in which the item can be loaded based on the pre-stored interior space information for each vehicle type. The determination unit 210 may generate information for guiding the change of the vehicle type including information on the referred vehicle type in which the items can be loaded, and may determine the loading space and the arrangement location based on the corresponding vehicle type.

The generation unit 220 may generate arrangement guide information based on the determined loading space and arrangement location. The arrangement guide information may include an item arrangement diagram visually expressing the arrangement location at which the item is to be placed in the loading space. As another example, the arrangement guide information may include a message notifying the loading space and the arrangement location.

The generation unit 220 may provide the user with the arrangement guide information. The generation unit 220 may transmit the arrangement guide information to the terminal 120 or the vehicle 110, so that the user can visually recognize the arrangement guide information. In some embodiments, the generation unit 220 may generate control information such that a display provided in the terminal 120 or the vehicle 110 outputs one or more graphic objects each corresponding to the loading space and the arrangement location, or an irradiation device irradiates light to the arrangement location in the loading space.

According to embodiments, the generation unit 220 may receive the arrangement change information from the user in response to the arrangement guide information. The generation unit 220 may generate arrangement history by associating at least some of user information, item information, vehicle information, arrangement guide information, and/or arrangement change information. The generation unit 220 may store the generated arrangement history in the storage unit 230.

The storage unit 230 may store various programs and data for implementing a method of providing the arrangement guide information according to one embodiment of the present disclosure. For example, the storage unit 230 may store information on the interior space of the vehicle 110. The interior space information may include at least one of a size of a trunk space of the vehicle 110, a size of a frunk space, a size of a floor space, a size of a space on a seat, and/or a size of a space on a folded seat, or any combination thereof. The storage unit 230 may establish a vehicle information database by associating a vehicle type with information on the interior space of the corresponding vehicle type and storing the associated information. The storage unit 230 may establish an item information database by associating identification information of an item and information on the item and storing the associated information. The storage unit 230 may store arrangement history in which at least some of user information, item information, vehicle information, and arrangement change information are associated with each other.

Figure 3:
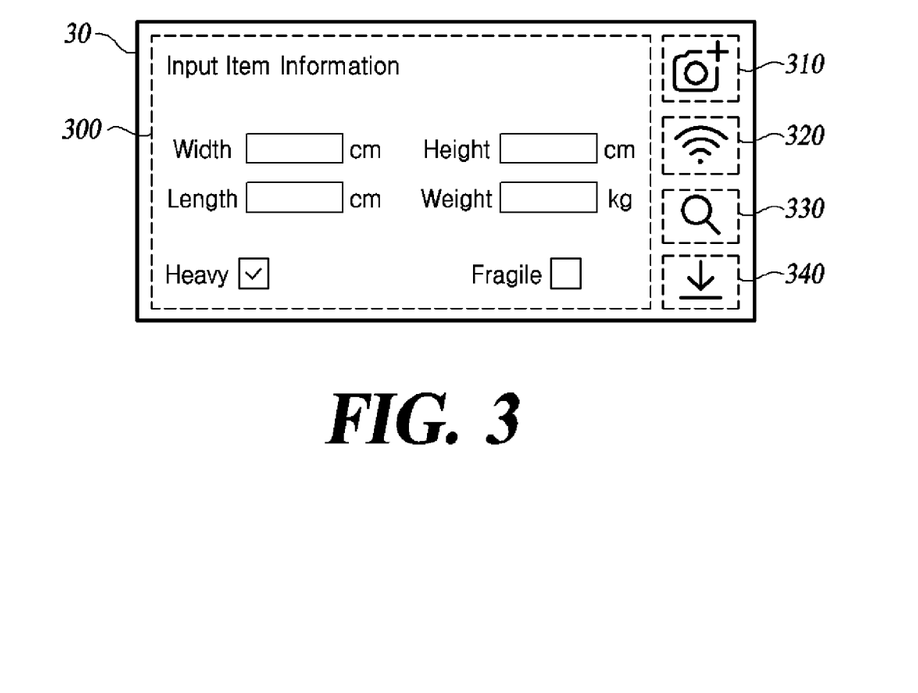
FIG. 3 is an exemplary diagram for explaining a method of acquiring information on an item according to one exemplary embodiment of the present disclosure.

FIG. 3 is an exemplary diagram for explaining a method of acquiring information on an item according to one exemplary embodiment of the present disclosure.

According to one embodiment of the present disclosure, the vehicle 110 or the terminal 120 may receive information on an item using a screen 30 for inputting the item information.

The item information input screen 30 according to one embodiment of the present disclosure may include at least one first graphic object 300 through which a user can input the information on the item. Meanwhile, FIG. 3 illustrates an example of receiving the item information input by the user using a text box and/or a check box as the first graphic object 300. However, this is only one example, and the method of receiving the item information from the user is not limited thereto. As an example, the user may select the size and/or the weight of the item using a slider or a spin box. As another example, the user may select the type and/or the priority information of the item using a radio button or a combo box.

The item information input screen 30 according to one embodiment of the present disclosure may include a second graphic object 310 for recognizing information on an item using a camera provided in the vehicle 110 or the terminal 120. For example, when a preset touch is applied to the second graphic object 310, the camera provided in the vehicle 110 or the terminal 120 may be activated to photograph the item or a corresponding QR code and/or barcode corresponding to the item.

The item information input screen 30 according to one embodiment of the present disclosure may include a third graphic object 320 for communicating with a communication module provided in an item. For example, when a preset touch is applied to the third graphic object 320, the vehicle 110 or the terminal 120 may communicate with a smart tag provided in the item and may receive identification information of the item or information on the item.

The item information input screen 30 according to one embodiment of the present disclosure may include a fourth graphic object 330 for referring to the information on the item in the item information database previously stored in the guide device 100 or a separate external server. For example, when a preset touch is applied to the fourth graphic object 330, the identification information of the item may be input by the user, and based on this, the information on the item may be referred to in the item information database previously stored in the guide device 100 or the separate external server.

The item information input screen 30 according to one embodiment of the present disclosure may include a fifth graphic object 340 for fetching previously stored information on an item. For example, when a preset touch is applied to the fifth graphic object 340, at least one pre-stored information on the item may be displayed on the item information input screen 30. Accordingly, the user may select any one of the at least one pre-stored information on the item.

Figure 4:
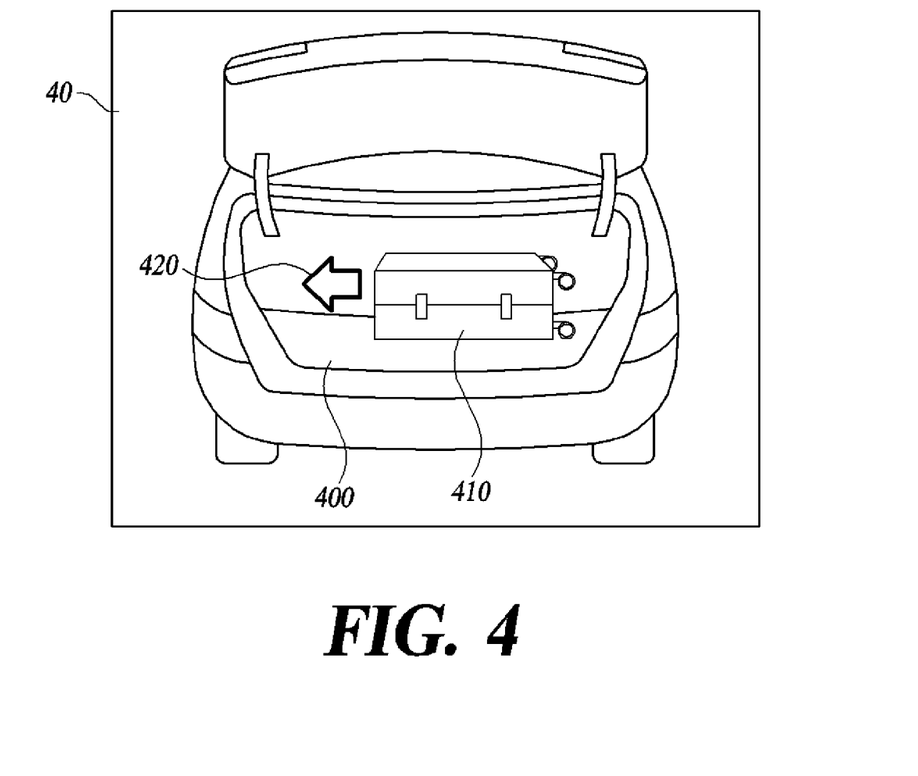
FIG. 4 is an exemplary diagram for explaining a method of providing arrangement guide information according to one exemplary embodiment of the present disclosure.

FIG. 4 is an exemplary diagram for explaining a method of providing arrangement guide information according to one exemplary embodiment of the present disclosure.

According to one embodiment of the present disclosure, the vehicle 110 or the terminal 120 may display an arrangement guide screen 40 to provide a user with the arrangement guide information.

The arrangement guide screen 40 may include an item arrangement diagram visually representing the arrangement location in which the item is to be placed in the loading space.

Specifically, the arrangement guide screen 40 may include all or some of a sixth graphic object 400 corresponding to a determined loading space and/or a seventh graphic object 410 corresponding to a determined arrangement location.

The sixth graphic object 400 may include a virtual image corresponding to the determined loading space or an image obtained by photographing the determined loading space. For example, in case that the determined loading space is a trunk, the sixth graphic object 400 may include a virtual image generated based on the information on the interior space of the trunk or an image obtained by photographing the interior space of the trunk.

The seventh graphic object 410 may include a virtual image corresponding to the item or an image obtained by photographing the item. For example, the seventh graphic object 410 may include a virtual image generated based on the type and/or the size of the item or an image photographed by a camera provided in the vehicle 110 or the terminal 120. In another example, the seventh graphic object 410 may include an image stored in association with the identification information of the item in the guide device 100 and/or the separate external server.

The size and the location of the seventh graphic object 410 may be determined based on the size of the item, the arrangement location, and the information on the interior space of the vehicle corresponding to the loading space. Accordingly, it is possible to provide the user with a screen as if the item is actually placed in the interior space of the vehicle.

The arrangement guide screen 40 according to one embodiment of the present disclosure may further include at least one eighth graphic object 420 for receiving arrangement change information input by the user. For example, the location or posture of the seventh graphic object 410 may be changed when a preset touch is applied to the eighth graphic object 420. The arrangement guide screen 40 according to one embodiment of the present disclosure may also change the location or posture of the seventh graphic object 410 when the preset touch is applied to the seventh graphic object 410.

Although not illustrated in FIG. 4, the arrangement guide screen 40 may further include at least one ninth graphic object for receiving information for change of the loading space, as the arrangement change information, input by the user. For example, a list of one or more interior spaces in which the item can be loaded is displayed on the arrangement guide screen 40 when a preset touch is applied to the ninth graphic object. Accordingly, in case that the user selects a specific interior space, the sixth graphic object 400 and/or the seventh graphic object 410 corresponding to the corresponding interior space may be displayed on the arrangement guide screen 40.

As described above, according to one embodiment of the present disclosure, in case that the loading space or the arrangement location determined by the guide device 100 is unsatisfactory, the user may check directly whether the item can be loaded in a desired space or location.

Meanwhile, FIG. 4 illustrates that one arrangement guide screen 40 includes only one seventh graphic object 410 as an example, but the present disclosure is not limited thereto. For example, the arrangement guide screen 40 according to another embodiment of the present disclosure may include a plurality of seventh graphic objects 410 which respectively correspond to a plurality of items.

Figure 5:
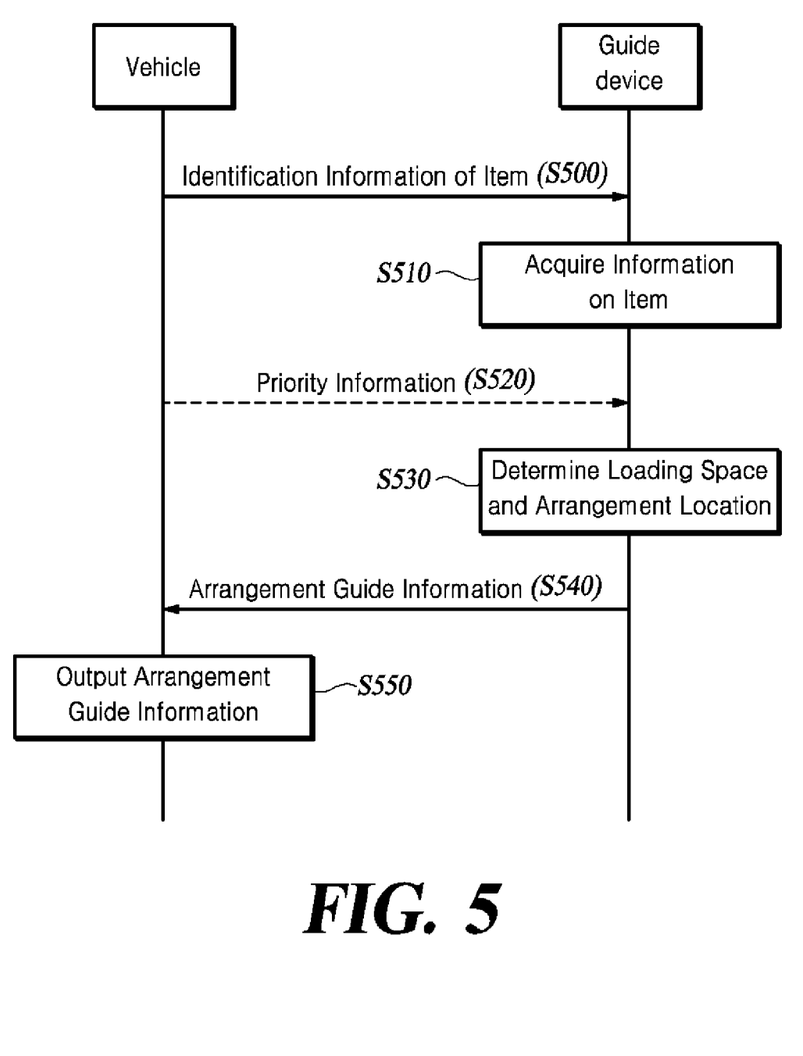
FIG. 5 is a flowchart for explaining a method of providing an item arrangement guide service according to one exemplary embodiment of the present disclosure.

FIG. 5 is a flowchart for explaining a method of providing an item arrangement guide service according to one exemplary embodiment of the present disclosure.

The guide device 100 may receive identification information of items from the vehicle 110 (S500). To this end, the vehicle 110 may photograph the item or a QR code or barcode corresponding to each item. As another example, the vehicle 110 may receive a serial number corresponding to each item input by a user. As another example, the vehicle 110 may receive a serial number from a smart tag provided to each item using a communication unit.

The guide device 100 may acquire information on the items based on the identification information of each item (S510). Here, the information on the items may include at least some of the number of the items, and the type, the size, and the weight of each item.

The guide device 100 may receive priority information of the items as information on the items from the vehicle 110 (S520). To this end, as the priority information of the items, the user may input through the HMI provided in the vehicle 110 whether the item is a heavy item, whether the item is likely to be damaged, unloading location and/or unloading order corresponding to each item, and the like.

Based on the information on the items and the information on the interior space of the vehicle, the guide device 100 may determine a loading space in which each item is to be loaded and/or an arrangement location in which each item is to be placed in the loading space (S530). To this end, the guide device 100 may store the information on the interior space of the vehicle 110. According to embodiments, the guide device 100 may receive information on the vehicle type from the vehicle 110 and, based on the received information of the vehicle type, may refer to the information corresponding to the vehicle type of the vehicle 110 in the previously stored information on the interior space for each vehicle type.

The guide device 100 may generate arrangement guide information and transmit it to the vehicle 110 (S540). The arrangement guide information may include the determined loading space and/or the determined arrangement location. According to embodiments, the arrangement guide information may include an item arrangement diagram visually representing the arrangement location at which the item is to be placed in the loading space.

The vehicle 110 may output the received arrangement guide information (S550). For example, the vehicle 110 may visually represent the arrangement location at which the item is to be placed in the loading space using a display and/or a laser.

Figure 6:
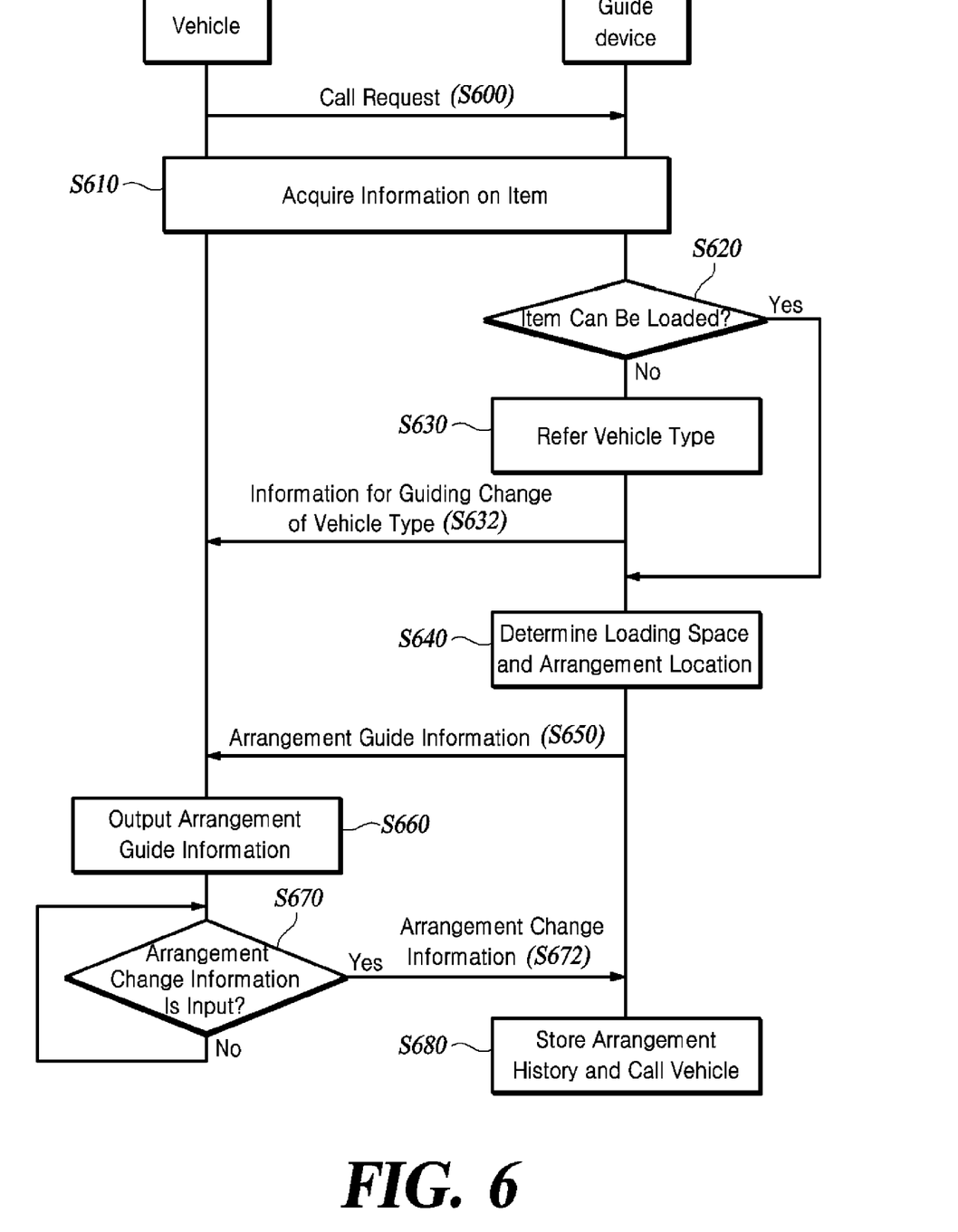
FIG. 6 is a flowchart for explaining a method of providing an item arrangement guide service according to another exemplary embodiment of the present disclosure.

FIG. 6 is a flowchart for explaining a method of providing an item arrangement guide service according to another exemplary embodiment of the present disclosure.

The guide device 100 may receive a call request from the terminal 120 (S600). Here, the call request may include at least some of a desired vehicle type, a destination, and the number of occupants.

The guide device 100 may acquire information on the items in association with the terminal 120 (S610). The information on the items may include at least some of the number of the items, and the type, the size, the weight, and/or the priority information of each item, or any combination thereof. The priority information may include whether the item is heavy, whether the item is likely to be damaged, unloading location and/or unloading order corresponding to each item, and the like. According to embodiments, in case that destinations are different for respective passengers, the guide device 100 may determine the unloading location and/or the unloading order corresponding to each item based on the destination of the owner of each item.

The guide device 100 may receive information on the item from the terminal 120, or may receive the identification information of the item from the terminal 120, and, based on the received information, may acquire information on the item.

According to embodiments, the information on the item and/or the identification information of the item may be included in the call request.

Based on the information on the item and the pre-stored information on the interior space for each vehicle type, the guide device 100 may determine whether the item can be loaded in the pre-selected type of vehicle (S620). For example, after referring to the information corresponding to the vehicle type included in the vehicle call request in the pre-stored database with respect to the interior space of each vehicle type, the guide device 100 may determine whether the pre-selected type of vehicle has an interior space larger than the size of the item.

In response to determining that it is impossible to load the item in the pre-selected type of vehicle, the guide device 100 may refer to another type of vehicle in which the item can be loaded based on the previously stored information on the interior space for each vehicle type (S630).

The guide device 100 may generate information for guiding change of the vehicle type including information on the referred another vehicle type and transmit it to the terminal 120 (S632). Here, the vehicle type change guide information may include a message recommending to change the vehicle type to the referred another vehicle type.

The guide device 100 may determine the loading space in which the item is to be loaded and/or the arrangement location at which the item is to be placed in the loading space based on the information on the item and the information on the interior space of the vehicle (S640). Here, the information on the interior space of the vehicle may indicate the information on the interior space of the vehicle corresponding to the pre-selected vehicle type or the changed vehicle type.

The guide device 100 may generate arrangement guide information and transmit it to the terminal 120 (S650). The arrangement guide information may include the determined loading space and/or the determined arrangement location. According to embodiments, the arrangement guide information may include an item arrangement diagram visually representing the arrangement location in which the item is to be placed in the loading space.

In response to receiving arrangement change information input by the user, the terminal 120 may transmit the arrangement change information to the guide device 100 (S670 and S672). The arrangement change information may include information on the change of one or both of the arrangement location and the posture of the item. According to embodiments, the arrangement change information may further include information on change of the loading space for the item.

The guide device 100 may associate at least one of arrangement history with at least some of user information, item information, vehicle information, arrangement guide information, and arrangement change information to store it as the arrangement history, and call a vehicle corresponding to the pre-selected vehicle type or the changed vehicle type (S680). Here, the user information may include unique identification information about the user.

As described above, according to one embodiment of the present disclosure, by acquiring the information on the item or the identification information of the item and providing the arrangement guide information through the terminal 120, the user can grasp how to place the item in the vehicle 110 before calling the corresponding vehicle 100.

Furthermore, according to one embodiment of the present disclosure, in case that it is determined that it is impossible to load the item in the vehicle selected by the user, it is recommended to change the called vehicle to another vehicle in which the item can be loaded, and the arrangement guide information for the corresponding vehicle can be provided.

Furthermore, according to one embodiment of the present disclosure, it is possible to provide the arrangement guide information reflecting a user's preference by storing arrangement history and/or by using it to determine the loading space and/or the arrangement location in the future.

Hereinafter, an example in which the guide device 100 is implemented in a form included in the vehicle 110 will be described.

Figure 7:
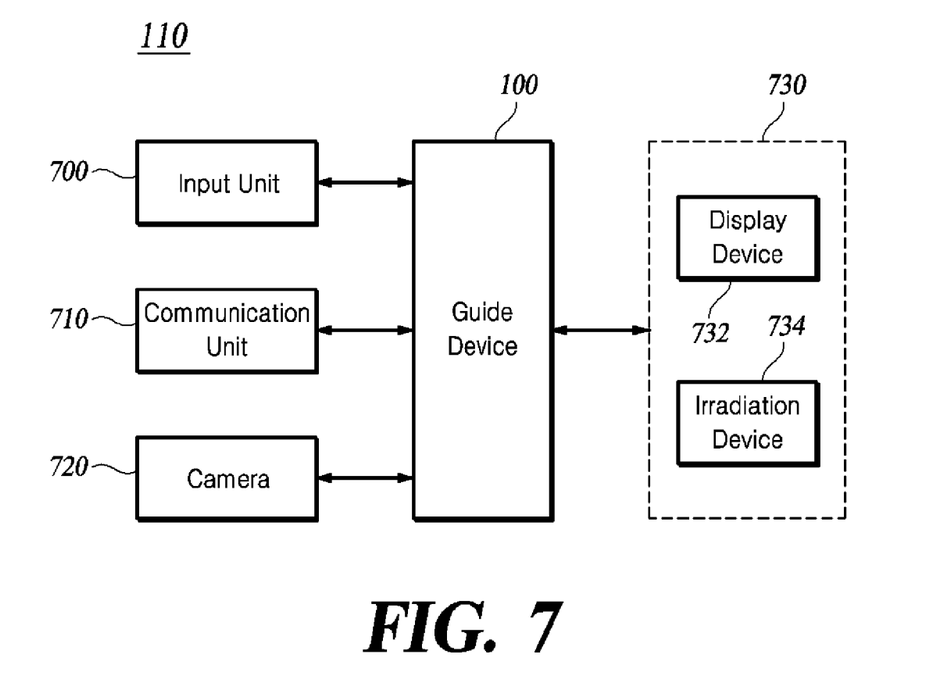
FIG. 7 is a block diagram illustrating components of a vehicle including the guide device according to one exemplary embodiment of the present disclosure.

FIG. 7 is a block diagram illustrating components of the vehicle including the guide device according to one exemplary embodiment of the present disclosure.

Figure 8:
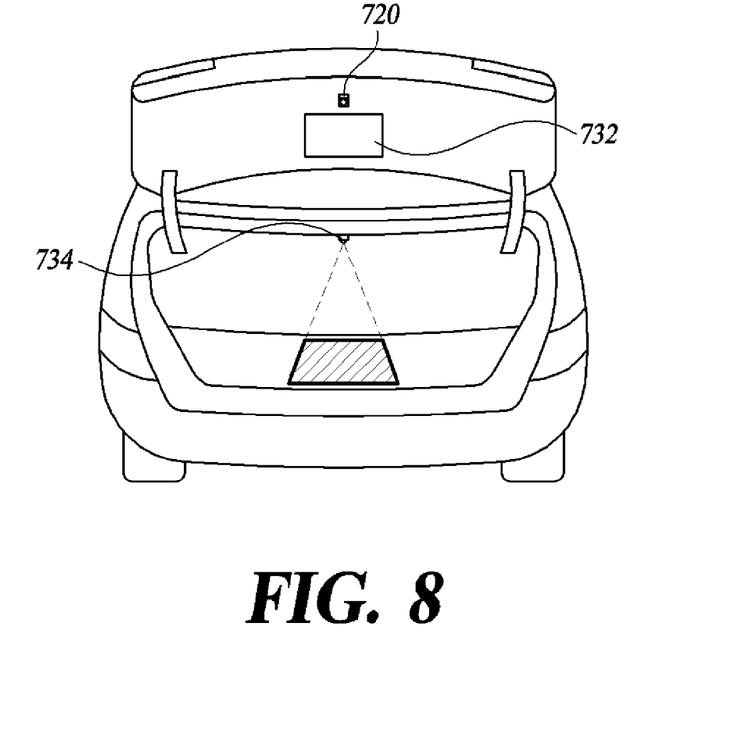
FIGS. 8 and 9 are diagrams illustrating locations of components of the vehicle according to one exemplary embodiment of the present disclosure.
Figure 9:
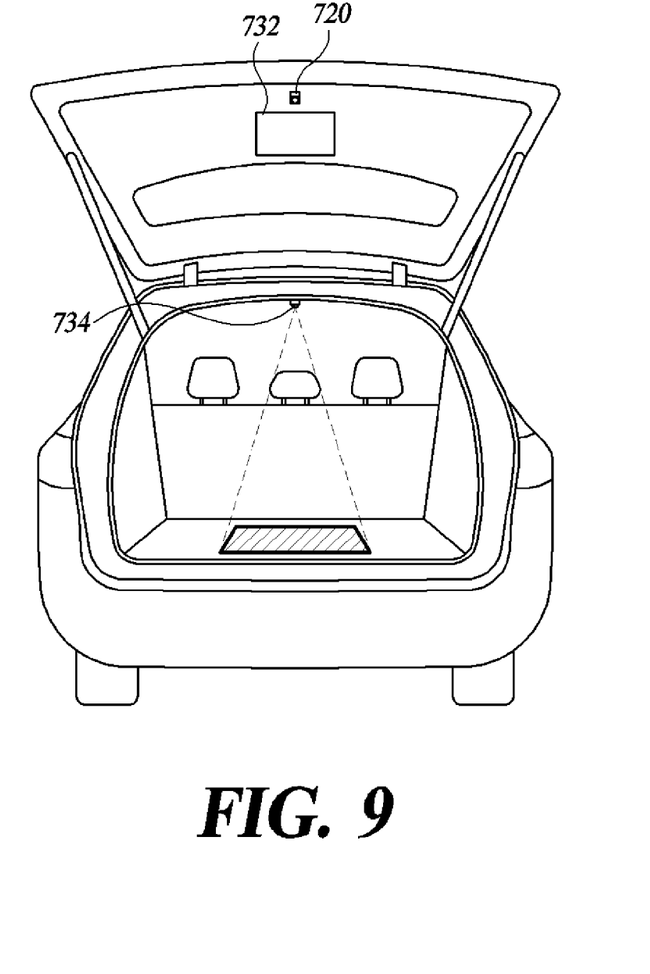

FIGS. 8 and 9 are diagrams illustrating locations of the components of the vehicle according to one exemplary embodiment of the present disclosure.

Referring to FIG. 7, the vehicle 110 according to one embodiment of the present disclosure may include all or part of an input unit 700, a communication unit 710, a camera 720, an output unit 730, and the guide device 100. Each of the components is a device or logic mounted in the vehicle 110, and may indicate a unit for processing at least one function or operation, and may be implemented by hardware, software, or a combination of hardware and software. Not all of the blocks shown in FIG. 7 are essential components, and in another embodiment, some blocks included in the vehicle 110 may be added, changed, or removed.

Meanwhile, in the following description, the guide device 100 is a separate device provided in a vehicle, and will be described as a device to provide an item arrangement guide service by transmitting and receiving necessary information through data communication with other components of the vehicle 110. In another embodiment of the present disclosure, a set of some of the components of the vehicle 110 may be defined as the guide device 100.

The guide device 100 may include at least some of the other components of the vehicle 110. For example, the guide device 100 may include at least one of the input unit 700, the camera 720, and the output unit 730.

Each component of the vehicle 110 may transmit and receive signals through an internal communication system (not shown). The signals may include data. The internal communication system may use at least one communication protocol (e.g., CAN, LIN, FlexRay, MOST, and Ethernet).

The input unit 700 is an HMI between the vehicle 110 and the user, and receives an input by the user to set or change set values of various functions. The input unit 700 may be implemented with at least one of a physical button, a touch panel, and/or a microphone. The input unit 700 may be combined with the output unit 730 to be described later to be implemented as a touch display or the like.

The input unit 700 may receive information on the item input by the user. For example, the user may input at least some of the number of the items, and the type, the size, and the weight of each item using the input unit 700.

The communication unit 710 is configured to communicate with an external device of the vehicle. The communication unit 710 may communicate with the terminal 120 using a wired/wireless communication method. For example, the communication unit 710 may receive the information on the item, the identification information of the item, and/or the item arrangement change information from the terminal 120, or may transmit the item arrangement guide information generated by the guide device 100.

The camera 720 may photograph the item that the user intends to load in the vehicle. For example, referring to FIGS. 8 and 9, the camera 720 may be provided at a trunk door or a tailgate of the vehicle 110 to photograph the item to be loaded in the vehicle, but the present disclosure is not limited thereto. For example, the camera 720 may be provided at another position of the vehicle body and may be set to face at least one of a front direction, a rear direction, a left direction, and a right direction of the vehicle.

In some embodiments, the camera 720 may further include an internal camera for photographing the loading space inside the vehicle.

The output unit 730 is an HMI between the vehicle 110 and the user and outputs the item arrangement guide information. For example, the output unit 730 may include all or part of a display device 732 and an irradiation device 734 so as to visually provide the user with the item arrangement guide information, but the present disclosure is not limited thereto. For example, the output unit according to another embodiment of the present disclosure may include a sound device and/or a haptic device.

The display device 732 may visually display the loading space and the arrangement location determined by the guide device 100. For example, the display device 732 may output the item arrangement diagram indicating the loading space and the arrangement location. The item arrangement diagram may include one or more graphic objects each corresponding to the loading space and the arrangement location.

The display device 732 may be implemented as an audio video navigation (AVN), a head-up display (HUD), a cluster, and/or a separate display disposed in an area of the vehicle 110 such as a seat, a trunk door, a tailgate or the like. For example, referring to FIGS. 8 and 9, the display device 732 may be configured to be disposed on the trunk door or the tailgate of the vehicle 110 such that the user may recognize the item arrangement guide information when the trunk door or the tailgate is opened, but the present disclosure is not limited thereto.

The irradiation device 734 may irradiate light to the arrangement location in the loading space based on the loading space and the arrangement location determined by the guide device 100. For example, referring to FIGS. 8 and 9, the irradiation device 734 may be configured to irradiate light to an area toward the interior space of the trunk, but the present disclosure is not limited thereto. In another example, the irradiation device 734 may irradiate light to an interior space other than the trunk or may irradiate light toward a road surface. The irradiation device 734 may be implemented as a laser, a lamp, a beam projector, or an LED lighting module, but the present disclosure is not limited thereto. Meanwhile, FIGS. 8 and 9 illustrate an example of displaying a 2D image corresponding to the item by irradiating light to the arrangement location in the loading space, but the present disclosure is not limited thereto. For example, in another embodiment, a 3D image corresponding to the item may be displayed on the arrangement location in the loading space.

The guide device 100 may perform operations and controls related to providing the item arrangement guide information in association with the input unit 700, the communication unit 710, the camera 720, and/or the output unit 730.

The guide device 100 may acquire the information on the item based on data received from the input unit 700 or the communication unit 710.

The guide device 100 may acquire the information on the item based on the image photographed by the camera. The guide device 100 may acquire the information on the interior space of the vehicle based on the image photographed by the internal camera. Here, the information on the interior space of the vehicle may include the size of the interior space, whether there is a previously loaded item in the interior space, the location, the size, and the type of the previously loaded item, and/or the size of the remaining space in the interior space.

The guide device 100 may control the output unit 730 to output the arrangement guide information.

In one embodiment, the guide device 100 may generate control information for allowing the irradiation device 734 to irradiate light to the arrangement location in the loading space.

In another embodiment, the guide device 100 may generate the control information for allowing the irradiation device 734 to irradiate light toward a road surface and display the item arrangement diagram on the road surface.

In another embodiment, the guide device 100 may generate the control information for allowing the display device 732 to output one or more graphic objects each corresponding to the loading space and the arrangement location, and display the item arrangement diagram on the display device 732. For example, the guide device 100 may control the display device 732 to output the arrangement guide screen 40 as shown in FIG. 4.

Figure 10:
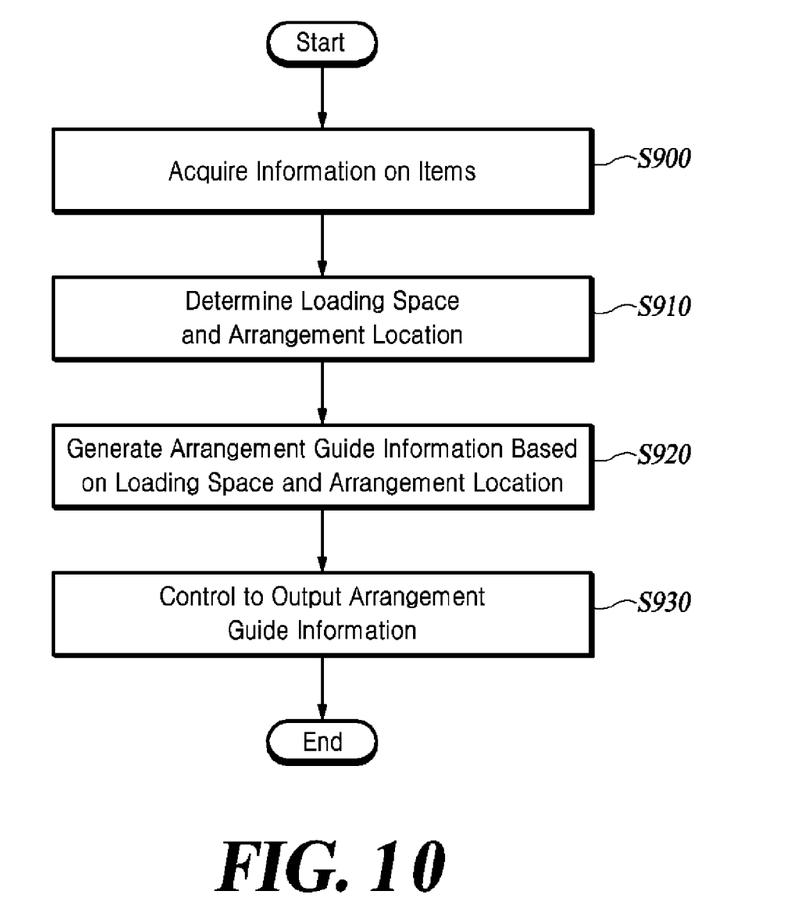
FIG. 10 is a flowchart illustrating a method of guiding arrangement of items according to one exemplary embodiment of the present disclosure.

FIG. 10 is a flowchart illustrating a method of guiding an item arrangement according to one exemplary embodiment of the present disclosure.

Since the method shown in FIG. 10 may be performed by the above-described guide device 100 or the vehicle 110 equipped with the same, redundant descriptions will be omitted.

The guide device 100 may acquire information on items (S900).

In one embodiment, the guide device 100 may receive the information on the items from a user through the input unit 700. For example, the guide device 100 may receive information on at least one of the number of the items, the type, the size, the weight of each item, whether the item is heavy, whether the item is likely to be damaged, unloading location and unloading order corresponding to each item input by the user through the input unit 700.

In another embodiment, the guide device 100 may receive identification information of each item and acquire the information on the item based on the identification information of the item. Here, the identification information of the item may be one or more of an image obtained by photographing the item, the name of the item, and a serial number, a QR code, and a barcode corresponding to the item.

Based on the information on the items and the information on the interior space of the vehicle, the guide device 100 may determine the loading space in which the item is to be loaded and the arrangement location at which the item is to be placed in the loading space (S910). The guide device 100 may select any one of a trunk, a frunk, a floor, a seat, and a folded seat as the loading space.

According to embodiments, based on the information on the item, the guide device wo may determine whether the item is placed at an outer side in the loading space relative to other items or at a lower side in the loading space relative to other items. For example, the guide device 100 may determine the arrangement location to be an outer side in the loading space in response to the priority information indicating that the item is expected to be unloaded earlier than other items. As another example, the guide device 100 may determine the arrangement location to be a lower side in the loading space in response to the information on the item indicating that the item is heavier than the other items. As another example, the guide device 100 may determine the arrangement location to be an upper side in the loading space in response to the first information indicating that the item is more fragile than the other items.

The guide device 100 may generate item arrangement guide information based on the determined loading space and the determined arrangement location (S920). Here, the item arrangement guide information may include an item arrangement diagram visually representing the arrangement location in the loading space.

The guide device 100 controls the output unit 730 to output the item arrangement guide information (S930). For example, the guide device 100 may control the irradiation device 734 to irradiate light to the arrangement location in the loading space. As another example, the guide device 100 may control the irradiation device 734 to irradiate light toward a road surface and display the item arrangement diagram on the road surface. As another example, the guide device 100 may control the display device 732 to output a graphic object indicating the loading space and the arrangement location and display the item arrangement diagram on the display device 732.

In the above, although a case where the vehicle 110 according to one embodiment of the present disclosure is a car has been described as an example, as described above, the vehicle 110 may include any transportation having a loading space, such as a bus, a truck and the like.

In the case that the guide information providing method according to one embodiment of the present disclosure is applied to a bus, the unloading locations and/or the unloading orders corresponding to the items may be the getting-off locations and/or the getting-off orders of the owners of the items. Accordingly, the guide device 100 may determine the arrangement location of each item in consideration of the getting-off orders of a plurality of passengers.

In the case that the guide information providing method according to one embodiment of the present disclosure is applied to a truck, the unloading locations and/or the unloading orders of the items may be determined in consideration of a delivery route of the user. The guide device 100 may receive the delivery route input by the user through the input unit 700 and may determine the arrangement location of each item based on the input information.

Each component of the device or the method according to embodiments of the present disclosure may be implemented as hardware or software, or may be implemented as a combination of hardware and software. In addition, functions of each component may be implemented as software, and microprocessors may be implemented to execute functions of software corresponding to each component.

Various implementations of systems and techniques described herein may be realized by a digital electronic circuit, an integrated circuit, a field programmable gate array (FPGA), an application specific integrated circuit (ASIC), computer hardware, firmware, software, and/or a combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) contain instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, RAM, CD-ROM, magnetic tape, floppy disk, memory card, hard disk, optical disk, and storage device, and may further include a temporary medium such as a data transmission medium. In addition, the computer-readable recording medium may be distributed in a network-connected computer system, and computer-readable codes may be stored and executed in a distributed manner.

Although it is described that the processes are sequentially executed in the flowchart/timing diagrams of embodiments of the present disclosure, this is merely illustrative of the technical idea of some embodiments of the present disclosure. In other words, since a person of ordinary skill in the art to which the embodiments of the present disclosure pertain may make various modifications and changes by changing the processes described in the flowchart/timing diagrams or performing one or more of the processes in parallel without departing from the essential characteristics of the embodiments of the present disclosure, the flowchart/timing diagrams are not limited to a time-series order.

As described above, according to one embodiment of the present disclosure, it is possible to provide guide information for loading or arrangement of items to a user who intends to load the items in a vehicle.

According to another embodiment of the present disclosure, it is possible to propose an optimal loading space and/or arrangement locations to the user in consideration of previously stored information on the interior space of the vehicle and the likelihood of deformation of the items.

According to another embodiment of the present disclosure, it is possible for the user to simulate the arrangement of items before boarding the vehicle using a user's terminal.

According to another embodiment of the present disclosure, in case that it is impossible to load the items in the vehicle called by the user, another vehicle can be proposed to the user.

The effects of embodiments of the present disclosure are not limited to the above-mentioned effects, and other effects not mentioned will be clearly understood by those skilled in the art from the foregoing description.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method, performed by a device, for guiding an item arrangement in a vehicle, the method comprising:
    acquiring first information on an item;
    determining a loading space in which the item is to be loaded and an arrangement location at which the item is to be placed in the loading space based on the first information and second information on an interior space of the vehicle; and
    generating arrangement guide information based on the loading space and the arrangement location, wherein the arrangement location includes a relative location of the item with respect to a door associated with the determined loading space, or with respect to one or more other items to be stacked with the item in the determined loading space.

2. The method of claim 1, further comprising acquiring the first information on a plurality of items, wherein the first information comprises a number of each item, a type of each item, a size of each item, a weight of each item, or priority information of each item.

3. The method of claim 1, wherein acquiring the first information comprises:
    receiving identification information of the item; and
    acquiring the first information based on the identification information of the item.

4. The method of claim 3, wherein the identification information of the item comprises an image of the item, a name of the item, a serial number, a QR code, or a barcode.

5. The method of claim 1, wherein the loading space comprises a trunk, a frunk, a floor, a seat, or a folded seat.

6. The method of claim 1, wherein the first information includes priority information of the item, and wherein the relative location is determined based on the priority information.

7. The method of claim 6, wherein determining the loading space comprises determining the arrangement location to be an outer side in the loading space in response to the priority information indicating that the item is expected to be unloaded earlier than the one or more other items.

8. The method of claim 6, wherein determining the loading space comprises:
    determining the arrangement location to be a lower side in the loading space in response to the first information indicating that the item is heavier than the one or more other items; or
    determining the arrangement location to be an upper side in the loading space in response to the first information indicating that the item is more fragile than the one or more other items.

9. The method of claim 1, wherein generating the arrangement guide information comprises generating control information for allowing a display to output one or more graphic objects corresponding to the loading space and the arrangement location.

10. The method of claim 1, wherein generating the arrangement guide information comprises generating control information for allowing an irradiation device to irradiate light to the arrangement location in the loading space.

11. The method of claim 1, further comprising:
    determining whether it is possible to load the item in the vehicle based on the first information and the second information; and
    in response to a determination that it is impossible to load the item in the vehicle, referring to a vehicle type in which the item is allowed to be loaded based on pre-stored information on an interior space for each of a plurality of vehicle types.

12. The method of claim 11, further comprising generating information for guiding a change of the vehicle type comprising information on the vehicle type in which the item is allowed to be loaded.

13. The method of claim 1, further comprising:
    outputting the arrangement guide information to a user;
    acquiring arrangement change information from the user in response to the arrangement guide information output to the user; and
    associating at least two of the first information, the arrangement guide information, the arrangement change information, third information about the user, or fourth information about the vehicle with each other and storing the associated information.

14. A device comprising:

an acquisition device;

a determination device configured to determine a loading space in which at least one item is to be loaded and an arrangement location at which the at least one item is to be placed in the loading space, based on first information about the at least one item acquired by the acquisition device and second information of an interior space of a vehicle; and a generation device configured to generate arrangement guide information based on the loading space and the arrangement location, wherein the arrangement location includes a relative location of the at least one item with respect to a door associated with the determined loading space, or with respect to one or more other items to be stacked with the at least one item in the determined loading space.

15. The device of claim 14, wherein the first information about the at least one item comprises a number of each item, a type of each item, a size of each item, a weight of each item, or priority information of each item.

16. The device of claim 15, wherein the determination device is configured to determine the relative location based on the priority information.

17. The device of claim 14, wherein the determination device is configured to:

determine whether it is possible to load the item in the vehicle based on the first information and the second information; and in response to a determination that it is impossible to load the item in the vehicle, refer to a vehicle type in which the item is allowed to be loaded based on pre-stored information on an interior space for each of a plurality of vehicle types.

18. A vehicle comprising:

a vehicle body;

a camera coupled to the vehicle body; and a guide device configured to:

acquire first information on an item based on an image photographed by the camera;

determine a loading space in which the item is to be loaded and an arrangement location at which the item is to be placed in the loading space, based on the first information and second information of an interior space of the vehicle; and generate arrangement guide information based on the loading space and the arrangement location, wherein the arrangement location includes a relative location of the item with respect to a door associated with the determined loading space, or with respect to one or more other items stacked with the item in the determined loading space.

19. The vehicle of claim 18, further comprising a display device configured to display one or more graphic objects each corresponding to the loading space and the arrangement location.

20. The vehicle of claim 18, further comprising an irradiation device configured to irradiate light to the arrangement location in the loading space.

* * * * *